United States Patent [19]

Edwards

[11] 3,772,188
[45] Nov. 13, 1973

[54] SEWAGE TREATMENT APPARATUS AND METHOD

[76] Inventor: Richard N. Edwards, 409 Vernon Ter., Raleigh, N.C. 27609

[22] Filed: Feb. 28, 1972

[21] Appl. No.: 229,745

[52] U.S. Cl. ................... 210/15, 210/63, 210/173, 210/197
[51] Int. Cl. .............................................. C02c 1/10
[58] Field of Search ................................. 210/1-3, 210/10, 15, 18, 60, 61, 63, 64, 96, 173, 194, 195, 197, 199; 261/83, 116

[56] References Cited
UNITED STATES PATENTS

| | | | |
|---|---|---|---|
| 3,335,082 | 8/1967 | Ullrich | 210/18 X |
| 3,660,277 | 5/1972 | McWhirter et al. | 210/63 X |
| 2,054,395 | 9/1936 | Streander | 210/194 |
| 3,547,813 | 12/1970 | Robinson et al. | 210/15 X |
| 3,476,250 | 11/1969 | Fifer | 210/199 |
| 3,459,303 | 8/1969 | Bradley | 210/195 X |
| 3,650,950 | 3/1972 | White | 210/197 X |
| 3,677,409 | 7/1972 | Ferm et al. | 210/195 |
| 3,423,309 | 1/1969 | Albertson | 210/18 X |
| 3,133,017 | 5/1964 | Lambeth | 210/197 X |
| 3,271,304 | 9/1966 | Valdespino et al. | 210/197 X |

OTHER PUBLICATIONS

Lyon, W. A., "The Effect of Ultrasonics on Suspended Matter in Sewage," Sewage & Industrial Wastes, 23, 9, 1084 (1951).

Primary Examiner—Samih N. Zaharna
Assistant Examiner—Thomas G. Wyse
Attorney—Samuel G. Layton, Jr.

[57] ABSTRACT

An apparatus and method for the treatment of sewage and waste comprising an enclosed pressurized vessel for receiving transported sewage and for treating the same to provide biological and chemical oxidation and sterilization and undesirable color, taste, odor, phenol, cyanide and phosphate reduction and the combination therewith of transporting, from a point of collection to the point of treatment, liquid sewage and waste which has tendencies to become septic and build up undesirable chemicals, gases, odors, bacteria and the like during the transportation due to the lack of proper oxygen content therein and devices positioned directly in the sewage as it is transported for supplying oxygen thereto to prevent the same from becoming septic, control the build-up of the aforesaid undesirables and stimulate growth of desirable aerobic bacteria. The preferred pressurized vessel receives high purity oxygen as $O_2$ or $O_3$ in an upper portion thereof to define a pressurized gaseous oxygen atmosphere and includes a device for injecting a stream of the sewage into the gaseous atmosphere and against a comminutor device for breaking the sewage into small particles to allow the sewage and waste to quickly absorb the oxygen under pressure to provide rapid biological and chemical oxidation and ozone sterilization and reduce the aforesaid undesirables.

20 Claims, 14 Drawing Figures

INFLUENT

EFFLUENT

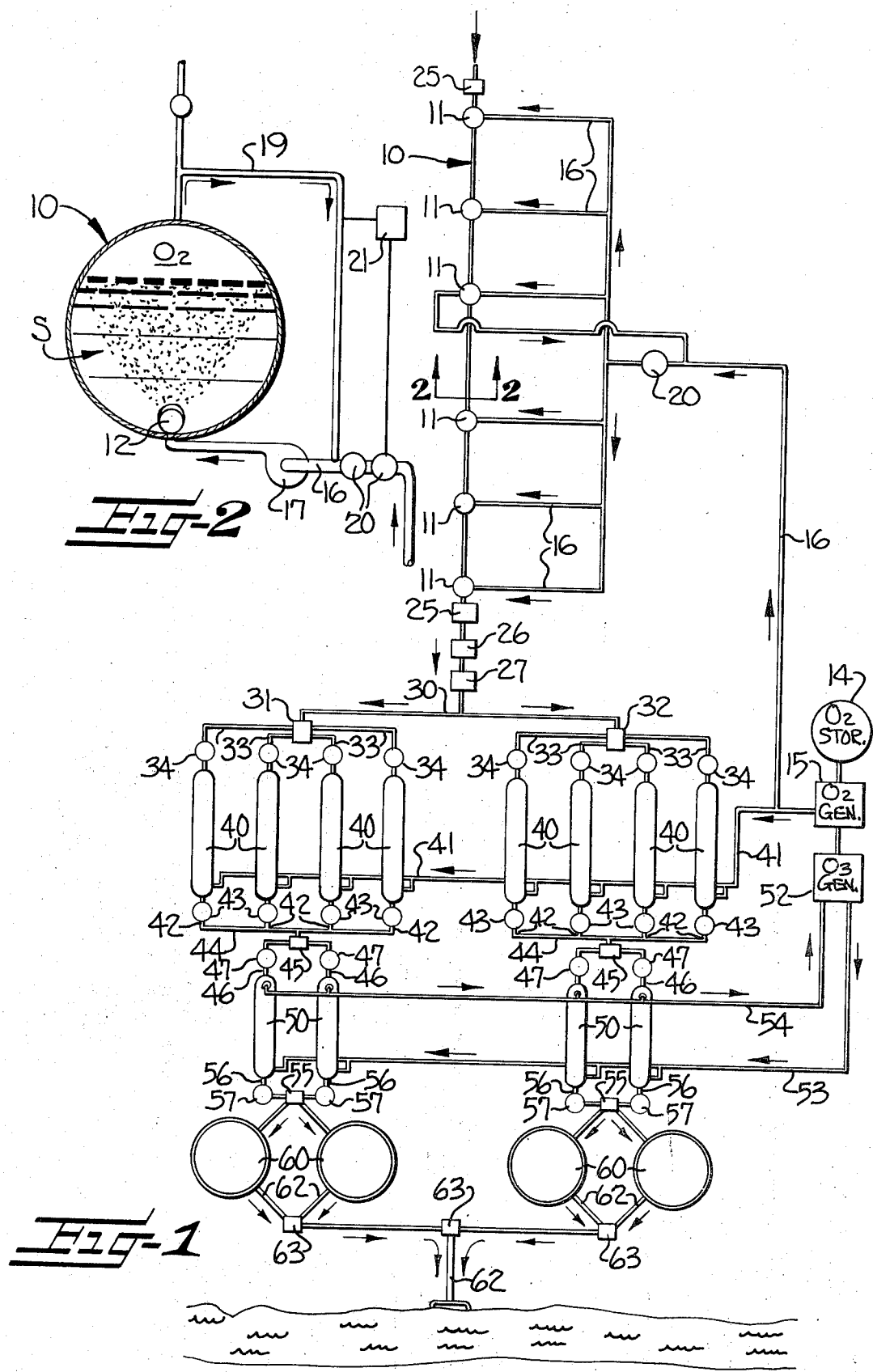

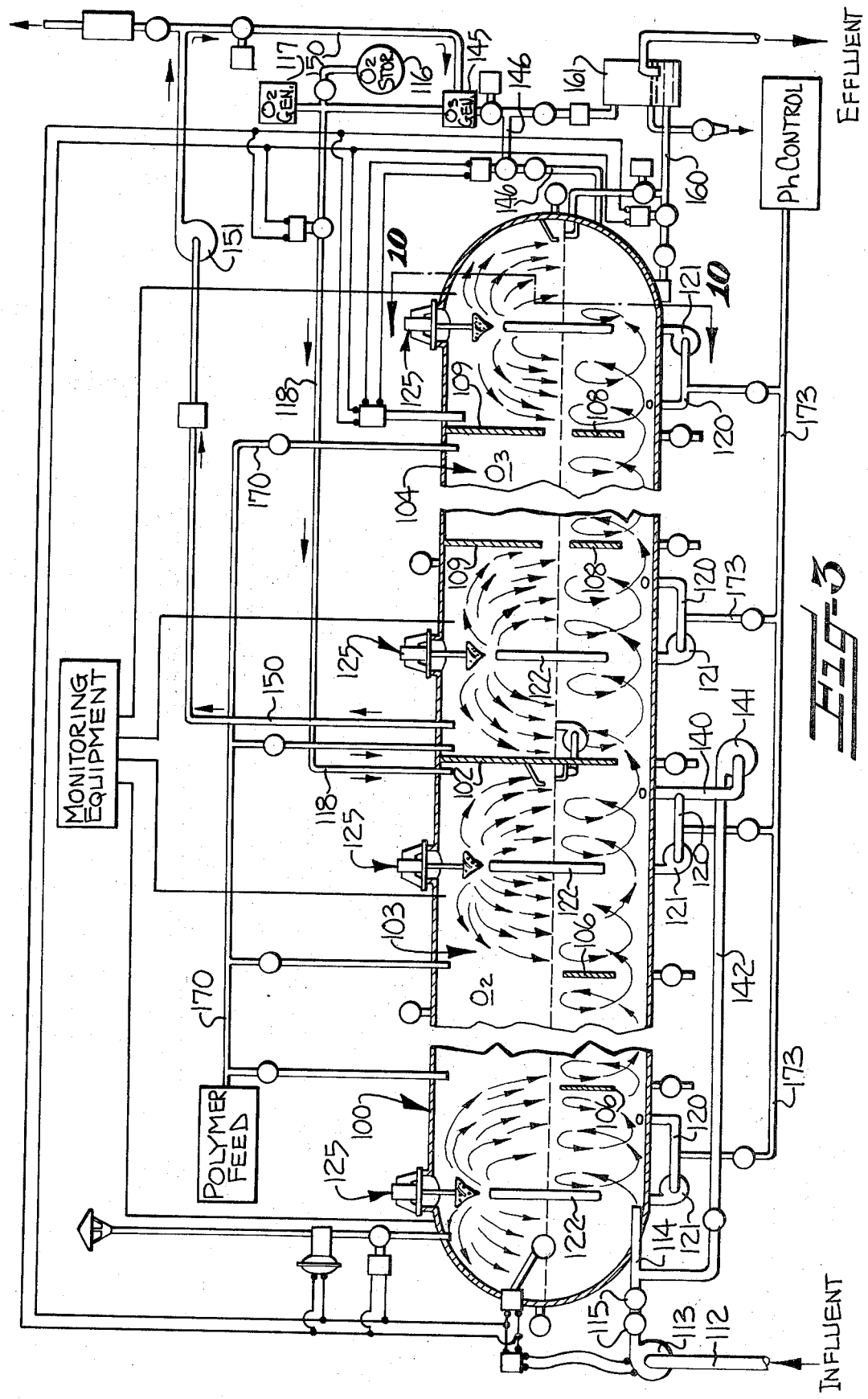

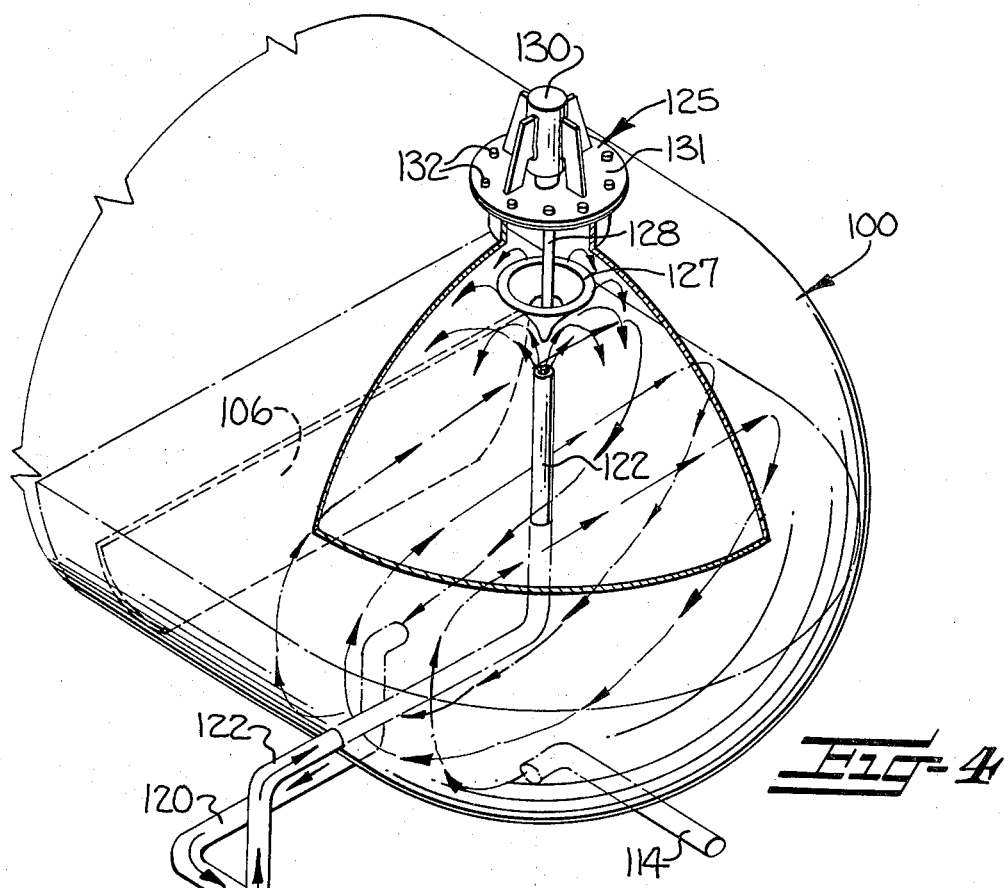
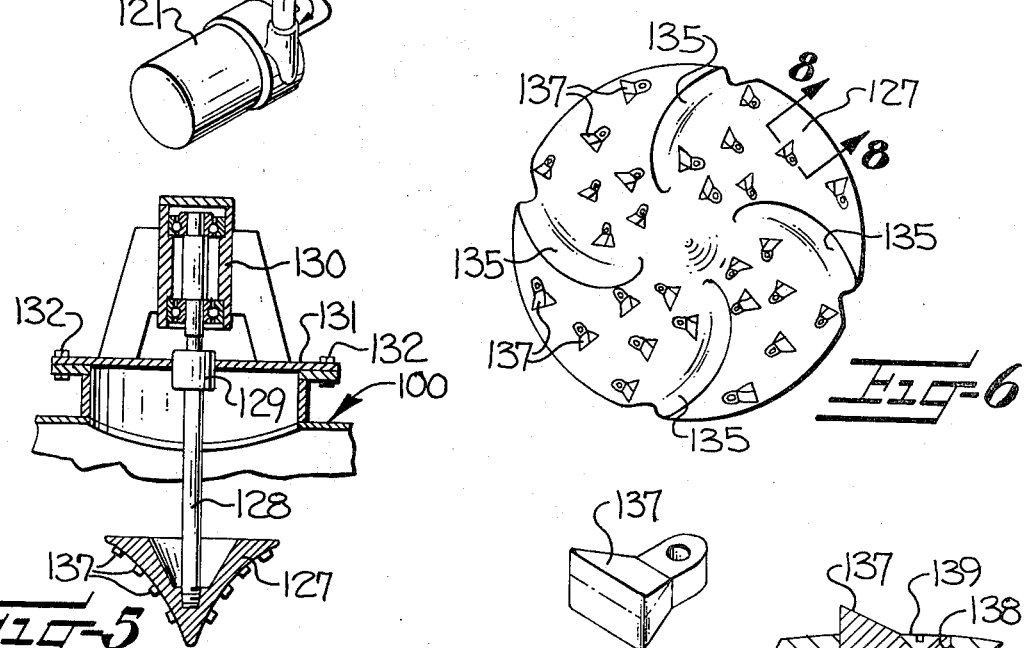
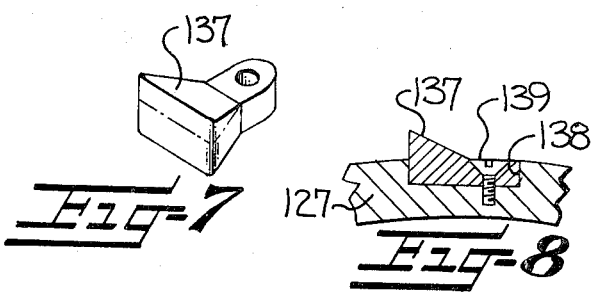

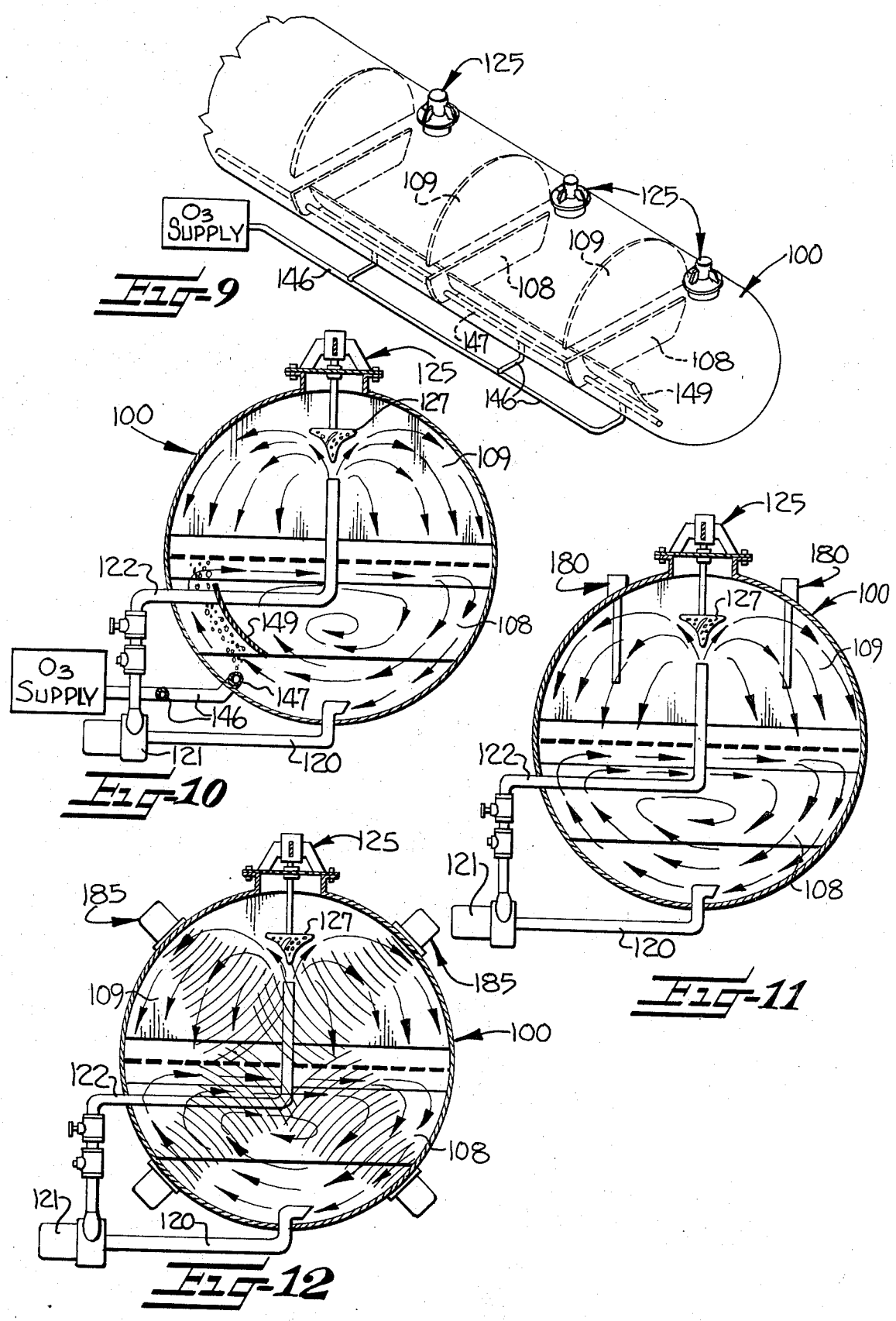

SEWAGE TREATMENT APPARATUS AND METHOD

This invention relates to apparatus and method for treating sewage and waste and more specifically to a novel enclosed pressurized vessel for treating sewage and waste with oxygen under pressure wherein the wastewater is introduced into the oxygen gas in small particles to provide biological and chemical oxidation and sterilization and undesirable color, taste, odor, phenol, cyanide and phosphate reduction and which is preferably used in combination with a preliminary sewage treatment system in which oxygen is supplied directly to sewage and waste as it is transported from a point of collection to a point of treatment to prevent the sewage and waste from becoming septic, controlling the build-up of undesirable chemicals, gases, odors and bacteria during the transportation and to stimulate the growth of desirable aerobic bacteria.

For about a half of a century, there has been very little progress in the general design of municipal and industrial sewage and wastewater treatment plants. Only refinements of old designs have held the attention of sanitary engineers.

Heretofore, sewage and wastewater has in large part been transported from a point of collection to a treatment plant without the advantages of any preliminary treatment of the sewage, the lack of which results in build-up of undesirable chemicals, gases, odors, bacteria and the like during the transportation due to lack of proper oxygen content in the transported sewage and waste. This sewage is then treated at a treatment plant by various apparatus and methods. This treatment of sewage and waste-water consists of basically three chemical phases. Firstly, oxygen, usually as contained in air, is dissolved into the sewage and wastewater. Secondly, the oxygen dissolved into the sewage and wastewater reacts directly and/or indirectly with the contaminates in the sewage and wastewater to change the contaminates into stable materials. Finally, bacteria are rendered harmless so that the treated water may be dispensed into a receiving stream or otherwise.

Although the specific designs of previously used sewage and waste treatment plants vary according to the particular usage and demands, all of these prior treatment plants suffer from many of the following disadvantages. The effluent is generally of low quality and not suitable for discharge or recycling. The influent often by-passes treatment at times of high flow and discharges untreated sewage into receiving streams. Chlorinated effluents are believed to have a detrimental effect on the delicate balance of nature in the downstream ecology. Ozone treated effluents do not carry a residual into the receiving stream. Phosphate removal is not economically practical with present process equipment. Too much valuable land is required to accommodate the excessively large, cumbersome structures now used to treat sewage and wastewater, the costs of lengthy outfalls pumps and force mains are much too great and the initial costs of treatment plants are more than the taxpayers can justly afford. The length of time required by conventional plants make large holding basins necessary. Too much land is presently required as a buffer around treatment plants to keep odors from causing complaints and endangering health and noxious odors are usually prevalent in many residental areas from septic waste and long outfalls. Presently designed treatment plants for municipalities cannot be mass produced in factory assembly lines and cannot be set up quickly in the field.

Accordingly, it is the object of this invention to provide a method and apparatus for the treatment of sewage and waste in which the treatment may be accomplished in one or more compact modular vessels which may be mass produced and conveniently erected on site and which will eliminate the above undesirable features of the conventional sewage treatment plants.

It has been found by this invention that the above object may be accomplished by providing a sewage and waste treatment apparatus for providing biological and chemical oxidation and sterilization and undesirable color, taste, odor phenol, cyanide and phosphate reduction in sewage and waste. The apparatus comprises an enclosed pressurized vessel preferably having an inlet for receiving liquid sewage and waste in a lower portion only and an outlet for discharging the treated liquid. A high purity oxygen supply means is connected to an upper portion of the vessel to define a pressurized gaseous oxygen atmosphere in the upper portion of the vessel. A device is provided for injecting a stream of liquid sewage and waste from the lower portion, at the effluent end of each stage, of the vessel into the gaseous atmosphere in the upper portion of the vessel and a comminutor device is disposed in the gaseous atmosphere in the upper portion of the vessel against which the stream of liquid sewage and waste is injected for breaking the liquid sewage including waste solids therein into small particles giving the wastewater many times the surface area than can be practically done by bubbling the gas into the liquid to allow the liquid sewage and waste to quickly absorb the oxygen under pressure in the gaseous atmosphere in the vessel by exposing more surface area of the liquid sewage to the oxygen to provide rapid biological and chemical oxidation and sterilization with ozone and reduce the aforesaid undesirables.

This enclosed pressurized vessel treatment apparatus is preferably used in combination with an intermediate sewage treatment system which includes a means for transporting, from a point of collection to a point of treatment, liquid sewage and waste which has tendencies to become septic and build up undesirable chemicals, gases, odors, bacteria and the like during the transportation due to the lack of proper oxygen content therein. The system further includes devices positioned directly in the sewage transporting mechanisms for supplying oxygen to the sewage and waste as it flows therethrough for preventing the sewage and waste from becoming septic, controlling the build-up of the aforesaid undesirables and stimulating the growth of desirable aerobic bacteria. This intermediate sewage treatment process and apparatus is set forth in more detail in applicant's prior U.S. Pat. No. 3,525,685, issued Aug. 25, 1970. This intermediate sewage treatment provides delivery to the enclosed pressurized treatment vessel of sewage containing desirable aerobic bacteria therein and which has been prevented from becoming septic and having the aforesaid undesirables therein. However, the specific enclosed pressurized vessel of this invention may be utilized to treat sewage and wastewater sludge which has not become septic and does not have the aforesaid undesirables therein due to a length transporting procedure or other pretreatment means.

The pressurized vessels can be located at any convenient site, e.g. hill top, underground, barges, ships, underwater, downtown, etc., and are not dependent on gravity for operation as are most present systems.

Specific details of the present apparatus and method will be given below; however, from the brief description of the invention given above, the following advantages may be clearly seen. The sewage including waste solids therein is broken up in the pressurized vessel in the oxygen atmosphere resulting in higher and quicker absorption of the oxygen. High purity oxygen in lieu of air is utilized for rapid degrading of the waste. All stages of the treatment may take place in a single, modular pressurized vessel. In most cases, sludge is oxidized to a fine ash eliminating separate sludge treating processes. By breaking up of the sewage and waste into smaller particles and exposing these smaller particles and thus more surface area of the sewage to a high purity oxygen atmosphere under pressure, more rapid reaction with the oxygen takes place resulting in rapid biological and chemical oxidation, and sterilization and un-desirable color, taste, odor and phosphate reduction with ozone.

Additionally, in most present day wastewater treatment systems, solids are removed by sedimation and floatation and are treated separately from the liquid wastewater. The solids (sludge) that are removed from the wastewater is usually biologically degraded under anaerobic conditions which require many days of retention with temperature control, and the disposal of the end product is difficult. The process is easily upset and often does not accomplish the intended results. The supernatant (liquid) which has to be returned to the treatment plant may upset the normal plant operations. If the solids that are removed are not properly digested, they become very odorous and are difficult to dewater.

This invention can be used in conjunction with existing wastewater treatment facilities to aerobically treat removed solids (sludge), replace trickling filters or replace activated sludge chambers allowing the plant to handle greater hydraulic, biological and chemical loads and produce a much higher quality end product.

By means of this invention using batch or continuous flow methods, the wastewater solids (sludge) can be treated under aerobic conditions in a much shorter period of time and produce a supernatant (draw-off liquid) that contains a biological and chemical oxygen demand lower than normal domestic wastewater that will not interfere with normal plant operations. The resulting solids will be odor-free and sterile and be of less volume than that produced by most present day means. The solids/liquid separation will be greatly improved.

Some of the objects and advantages of this invention having been stated, other objects will appear as the description proceeds, when taken in conjunction with the accompanying drawings, in which:

FIG. 1 is a schematic view of a typical layout of a sewage and wastewater treatment system constructed in accordance with this invention;

FIG. 2 is a schematic sectional view taken along the line 2—2 of FIG. 1 and illustrating the intermediate sewage treating apparatus;

FIG. 3 is a schematic vertical sectional view taken through a preferred form of an enclosed pressurized treatment vessel constructed in accordance with this invention;

FIG. 4 is an enlarged, partial, schematic, perspective view of the influent end portion of the enclosed pressurized treatment vessel of FIG. 3;

FIG. 5 is a vertical sectional view through one of the comminutor devices utilized in the treatment vessel of FIGS. 3 and 4;

FIG. 6 is a bottom plan view of the rotor of the comminutor device of FIG. 5 and taken generally in the direction of the arrow 6 of FIG. 5;

FIG. 7 is a perspective view of one of the teeth members utilized in the rotor of the communitor device of FIGS. 5 and 6;

FIG. 8 is a sectional view taken generally along the line 8—8 of FIG. 6;

FIG. 9 is a schematic perspective view with parts omitted of the effluent end of the treatment vessel of FIG. 3;

FIG. 10 is a sectional view taken generally along the line 10—10 of FIG. 3,

FIG. 11 is a sectional view taken through an enclosed pressurized vessel constructed in accordance with this invention with the addition thereto of ultraviolet light producing devices;

FIG. 12 is a view like FIG. 11 illustrating the addition thereto of devices for producing ultrasonic waves;

Figure 13:
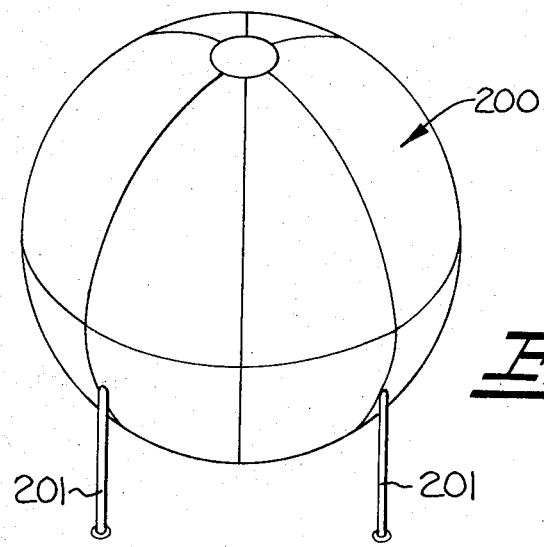
FIG. 13 is a perspective view of an enclosed pressurized vessel for batch treating liquid sewage or waste (sludge) constructed in accordance with this invention and in the form of a single chamber spherical vessel.

Referring now to the drawings, in FIG. 1 there is illustrated a schematic view of an exemplary layout of a possible sewage and wastewater treatment system constructed in accordance with this invention. At the top of FIG. 1 there is shown an arrow indicating the flow of the sewage and waste from a point of collection (not shown) through an intermediate sewage treatment system which comprises generally a means for transporting the sewage and waste in the form of an elongated, substantially enclosed, hollow conduit 10 which transports the sewage and waste S (see FIG. 2) therethrough by gravity flow. While the conduit 10 is the more conventionally used and preferred means for transporting of sewage and waste S from a point of collection to a point of treatment, this transporting means could be any type of sewage conveyors including trunk sewers, sewer outfalls, force mains, canals and other devices designed and constructed for the purpose of conveying sewage and waste.

The sewage transporting conduit 10 is normally located below ground and passes through conventional manholes 11 extending from the surface of the ground down to and around the sewage transporting conduit at spaced intervals therealong for proper maintenance of the conduit 10. The tops of the manholes 11 should be sealed to prevent the escape of oxygen. Intermediate treatment of the sewage during transporting through the conduit 10 is to prevent the sewage from becoming septic and to control the tendency of the sewage and waste to build up undesirable chemicals, gases, odors, bacteria and the like due to lack of proper oxygen content in the sewage and waste. For this purpose, there is provided an elongate, hollow oxygen dispensing tube 12 (see FIG. 2) of less cross-sectional dimensions than the sewage transporting conduit 10 and positioned directly in the bottom portion of the conduit 10 (see FIG. 2).

Air or oxygen is supplied to the air or oxygen dispensing tube 12 from any suitable source of supply, such as from an $O_2$ storage 14 and $O_2$ generator 15 (see FIG. 1) through suitable piping 16 to spaced portions of the oxygen dispening tube 12. Pumps 17 (FIG. 2) may be positioned at any convenient locations in the piping 16 for pumping the oxygen therefrom into the oxygen supply tube 12 within the sewage and waste conduit 10. The oxygen supply tube 12 includes suitably arranged apertures therein for dispensing or bubbling the oxygen therefrom into the sewage and waste S as it flows through the conduit 10. Suitable piping 19 extends from the upper portion of the conduit 10 (FIG. 2) and is connected with the piping 16 for recirculation of the high purity oxygen. Various check valves 20 and pressure sensor devices 21 may be utilized where desired.

The size of the oxygen dispensing tube 12 and the length thereof will vary according to field conditions for each installation. Normally, a plurality of predetermined lengths of oxygen dispensing tubes 12 are utilized in spaced portions of the overall sewage and waste conduit 10 for successively supplying oxygen to the sewage and waste S to insure that the sewage and waste, during its transportation from the point of collection to the point of treatment, receives sufficient oxygen therein for the purposes described above.

As stated above, this intermediate sewage treatment process and apparatus is set forth in more detail in applicant's prior U.S. Pat. No. 3,525,685, issued Aug. 25, 1970, and reference may be had to that patent for further details.

As may be seen in FIG. 1, the sewage and waste, prior to entering the treatment, apparatus may flow through a conventional gas sealing trap 25, screening device 26 and grit removal device 27.

From the sewage and waste transporting conduit 10, the sewage and waste may be introduced into a suitable conduit 30 which carries the sewage and waste to a multiplicity of distribution headers 31 and 32 which in turn distributes the liquid sewage and waste by pumps into a plurality of conduits 33 through which the sewage and waste flows through suitable valves into and through enclosed pressurized treatment vessels 40 where the sewage and waste is treated with oxygen in the form of $O_2$ under pressure to provide biological and chemical oxidation. Oxygen in the form of $O_2$ is supplied to the enclosed pressurized vessels 40 by suitable piping 41 leading from the $O_2$ storage and $O_2$ generator 14 and 15.

Following treatment of the sewage and waste in the enclosed pressurized treatment vessels 40, the sewage and waste is transported therefrom through conduits 42 which may have valves 43 therein into a common conduit 44 and into a distribution header 45 which distributes the sewage and wastewater into conduits 46 which may have valves 47 therein. From the conduits 46, the sewage and waste is introduced into additional enclosed pressurized treatment vessels 50 wherein the sewage and wastewater is treated with oxygen in the form of $O_3$ (ozone) under pressure for sterilization and color, taste, odor, phenol, cyanide, and phosphate reduction. Oxygen in the form of $O_3$ is supplied to the enclosed pressurized vessels from an $O_3$ generator 52 and piping 53. There may also be utilized piping 54 for recirculation of the $O_3$ from the vessels 50 to the $O_3$ generator 52. From the pressurized vessels 50 the treated water may be fed to a distribution header 55 by conduits 56 which may include check valves 57 therein. From the conduits 56, the water is fed into final clarification basins 60, if needed, and then through conduits 62 into a receiving stream or otherwise. The conduit 62 may also include distribution headers or valves 63.

While the above-described sewage and waste collection and treatment system (FIG. 1) utilizes separate enclosed pressurized vessels 40 and 50 for treatment of the waste and sewage with oxygen in the form of $O_2$ and $O_3$, this treatment with oxygen in the form of $O_2$ and $O_3$ may be performed in a single enclosed pressurized vessel, as described below.

Referring now to FIG. 3, there is illustrated therein a schematic view taken through a preferred form of an enclosed pressurized treatment vessel 100 constructed in accordance with this invention. This enclosed pressurized treatment vessel may comprise a fiber-glass or other type of enclosed tank and the size and length of the tank will be determined by the volume and pertinent characteristics of the sewage and waste to be treated. For larger installations, multi-tank arrangements would be utilized, as described above with respect to FIG. 1, to provide adequate capacity and take up a minimum of space.

The enclosed pressurized vessel 100 is divided internally by means of a baffle 102 generally into two main compartments 103 and 104, which function generally as separate treatment systems. The first compartment 103 includes a plurality of baffles 106 in a lower portion thereof dividing the compartment 103 into a plurality of successive treating chambers for multi-stage treatment. Likewise, the compartment 104 includes baffles 108 in the lower portion thereof and baffles 109 in the upper portion thereof dividing the compartment 104 into a plurality of successive treating chambers for multi-stage treatment. The influent of sewage and waste is received into the treatment vessel 100 through conduit 112, pump 113, and conduit 114 which may include valves 115 herein. The sewage and wastewater fills a lower portion of the treatment vessel 103 and the first chamber of the compartment 103, as indicated by the doted line in FIG. 3.

An $O_2$ storage 116 and $O_2$ generator 117 supply oxygen in the form of $O_2$ through pipe 118 which leads into the upper portion of comparment 103 so as to define a pressurized gaseous atmosphere of $O_2$ in the upper portion of the compartment 103 of the enclosed pressurized vessel 100. Each chamber of the compartment 103 includes a device for injecting a stream of the liquid sewage and waste from the lower effluent portion thereof into the gaseous atmosphere of oxygen in the form of $O_2$ under pressure in the upper portion thereof. This device comprises a conduit 120 leading from the bottom of the vessel 100, pump 121 for pulling the liquid sewage and waste from the bottom of the vessel 100 through conduit 120, and a conduit 122 leading back into the vessel 100 and terminating in the upper portion of each chamber of the compartment 103 for injecting a stream of the liquid sewage and waste into the gaseous atmosphere of oxygen in the form of $O_2$ in the upper portion of each of the compartments of the chamber 103 of the vessel 100.

A comminutor device 125 is disposed in the upper portion of each compartment of the chamber 103 within the gaseous atmosphere and against which the stream of liquid sewage and waste is injected for breaking the liquid sewage and waste nnto small particles to allow the liquid sewage and waste to fall through the gas to quickly absorb the oxygen in the form of $O_2$ under pressure in the gaseous atmosphere in each chamber of the compartment 102 and so that more surface area of the liquid sewage and waste will be exposed to the oxygen to provide rapid biological and chemical oxidation.

The comminutor devices, as may be seen more clearly in FIGS. 5-8, comprise a generally inverted conical-shaped rotor 127 secured to the end of a shaft 128 which passes through a pressure seal and sleeve 129 and is mounted for rotation in a ball-bearing device 130. The ball-bearing device 130 is carried by a plate 131 removably secured by bolts and nuts 132 to an upstanding portion of the housing of the vessel 100. The upstanding portions of vessel 100 in which the plate 131 is attached define apertures through which the shafts 128 extends into the upper portion of the vessel for suspending the rotor mechanisms 127. The above arrangement allows easy removal of the entire comminutor device when replacement or repair is necessary, and also provide means of access to the interior of the vessel 100.

Rotor 127 includes spiral grooves 135 spaced therearound so that when the stream of liquid sewage and waste is injected against the periphery thereof, the rotor mechanism will rotate due to the action of the stream on the grooves 135.

Disposed along the surface of the rotor mechanism 127 against which the stream of sewage and waste is injected are a plurality of spaced teeth 137 which are positioned in recesses 138 in the surface of the rotor 127 and held therein by threaded bolts 139, as shown in FIG. 8. The particular shape of these teeth 137, as shown particularly in FIGS. 7 and 8, provides pointed and cutting surface against which the sewage and waste contacts and, due to the rotating action of the rotor 127, these cutting surfaces of the teeth 137 will act to tear and cut and reduce to smaller particles solids within the sewage and waste S.

Thus it may be seen, as a stream of sewage and waste is injected against the comminutor device 125 in the gaseous atmosphere of oxygen in the form of $O_2$ under pressure in the upper portion of each successive chamber of the compartment 103 in the enclosed pressurized vessel 100, liquid sewage and waste will be broken up into many small particles providing extensive surface area for absorption of the oxygen therein for rapid biological and chemical oxidation.

As may be seen in FIG. 3, the liquid sewage and waste S after it is treated in a first chamber of the compartment 103, it will pass into the successive chambers and be treated in a similar manner until the biological oxygen demand of the sewage and waste is completely met. Additionally, at the end of the compartment 103 prior to the baffle 102, a recirculation conduit 140, pump 141 and conduit 140 is provided for recirculating desired amounts of the treated activated sewage and wastewater back to the influent conduit 114 for seeding the influent with activated sludge bacteria.

Following treatment of the sewage and waste S to effect chemical and biological ozidation in the successive chambers of the first compartment 103 of the enclosed pressurized treatment vessel 100, the thus treated liquid sewage and waste passes under baffle 102 into the first chamber of compartment 104. Each of the successive chambers of the compartment 104 include similar devices for injecting a stream of the liquid sewage and waste into the upper portion of the chambers and against a comminutor device 125, as described above in connection with the successive chambers of compartment 103. In the compartment 104, the gaseous atmosphere of oxygen in the upper portion thereof is in the form of $O_2$ and a percentage of $O_3$. The $O_3$ is supplied to the compartment 104 from an $O_3$ generator 145 and piping 146.

Referring specifically to FIG. 9, the piping 146 leads into a defuser pipe 147 which passes along the lower portion of the compartment 104 and includes apertures therein for bubbling or defusing the $O_3$ directly into the sewage and waste and against a longitudinally extending curved baffle 149 which causes a mixing and circulating action of the sewage and wastewater in the compartment 104. The gaseous $O_3$ bubbles through the sewage and wastewater for the ozonation of the $O_3$ with the wastewater and into the upper portion of the compartment 104 to form a gaseous atmosphere in the upper portion of each of the successive chambers in the compartment 104. A recirculation conduit 150 extends from the upper portion of the compartment 104 and includes a suitable pump 151 therein for recirculating the $O_3$ back through the $O_3$ generator 145, as may be seen in FIG. 3.

In a similar manner, as described above in connection with compartment 103, the liquid sewage and waste successively passes through each of the chambers of the compartment 104 and is treated with oxygen in the form of $O_3$ for sterilization and color, taste, odor, phenol, cyanide and phosphate reduction. Following complete treatment of the sewage and waste and from the last chamber of compartment 104, the thus treated liquid or water passes out of an effluent condit 160 and through a scum-removal and flash tank device 161, where excess dissolved $O_2$ and $O_3$ is flashed to a gas, captured, and drawn through a suitable pipe 174, through a dryer 175 and then to the ozone generator for reuse.

It will be noted that the schematic illustration in FIG. 3 shows numerous valves, etc. which need not be described for a full understanding of this invention and various controls and valves may be utilized where desired. Generally, any type of monitoring equipment, indicated schematically in block form in FIG. 3 may be utlilzed and this monitoring equipment and circuitry therefor may extend into each of the chambers of the compartments 103 and 104. Additionally, suitable electrical conrols may extend between the influent side and effluent side of the enclosed pressurized vessel for maintaining proper pressure within the vessel and these controls have been generally schematically illustrated in FIG. 3, but will not be described in detail. On either side of the baffle 102 dividing the vessel 100 in the compartments 103 and 104, and at the effluent end of the vessel 100, a scum transfer device may be utilized for transferring scum from the compartment 103 to the compartment 104 for treatment and for removing any remaining scum.

Further shown in FIG. 3 in schematic block form is a polymer or other chemical feed mechanism which allows polymers or other chemicals to be fed when desired through the piping 170 directly into each of the chambers of the compartments 103 and 104. Biological processes as used in sewage and waste treatment are relatively inexpensive, but limit the treatment effectiveness and efficiency. Where a high degree of treatment efficiency is required, or where specific contaminants such as toxic substances or nutrients must be removed, chemical treatment offers new opportunities. These chemicals which may be fed by the polymer feed include anionic, cationic, and non-ionic organic polymers which greatly increase the sedimentation and removal of solids and improve the efficiency of sludge dewatering and disposal.

Also, shown in FIG. 3, is a pH control device connected with a suitable piping 173 for feeding the desired chemicals into the sewage and waste in the vessel 100 to maintain a proper pH. The pH of a liquid, in simple terms, is the relative degree of acidity or alkalinity of the liquid. Maximum wastewater treatment is obtained in a relatively narrow pH range of the wastewater. When certain industrial wastes are discharged into the sewers, the resulting pH of the wastewater may be too high or too low for optimum treatment efficiency. In such cases, the pH of the wastewater will be controlled by feeding chemicals through the piping 173 into the sewage and wastewater in the vessel 100 to increase or decrease the pH so as to obtain the optimum degree of treatment.

It is to be understood, that the above described arrangement of a preferred enclosed pressurized treatment vessel 100 may be utilized for treating sewage and waste with oxygen in the form of $O_2$ only, in which case the entire vessel would be generally of the arrangement described with respect to the compartment 103 and a separate vessel could be utilized for treatment of the sewage and wastewater wiht oxygen in the form of $O_3$, in which the entire vessel would be generally arranged as described above in connection with the compartment 104. This is the general arrangement described above in connection with the overall system of FIG. 1.

Referring now to FIG. 11, the enclosed pressurized treatment vessel may include means 180 extending into the upper portion of desired chambers in the form of low pressure cold cathode mercury arc lamps for emitting ultraviolet light radiation a various wave lengths. Ultraviolet light acts as a catalyst for oxygen by raising the potential of the electrons of the oxygen molecules and thereby aids in oxygen reatment of the sewage and waste S. Additionally, disinfection of the sewage and waste prior to discharge into a stream could be accomplished by the generation of oxygen in the form of $O_3$ in a special reaction chamber constructed generally along the lines described above, in which the low pressure cold cathode mercury arc lamps are positioned for emitting ultraviolet light radiation. $O_3$ (ozone) is photochemically produced when a stream of oxygen or air is irradiated by an ultraviolet light that emits radiation in wave lengths of 210 nanometers or less.

Also, selected chambers of the enclosed pressurized treatment vessel 100 may include ultrasonic wave producing devices 185 (see FIG. 12) for producing ultrasonic waves into the vessel to aid in reducing phosphates and the like in the liquid sewage and waste S and for reducing the liquid particles passing through the gaseous atmosphere to still smaller particles providing greater surface or interface area and increasing the activity of the oxygen and liquid molecules to increase the collision of the particles for more rapid transfer of oxygen into the liquid particles.

Figure 14:
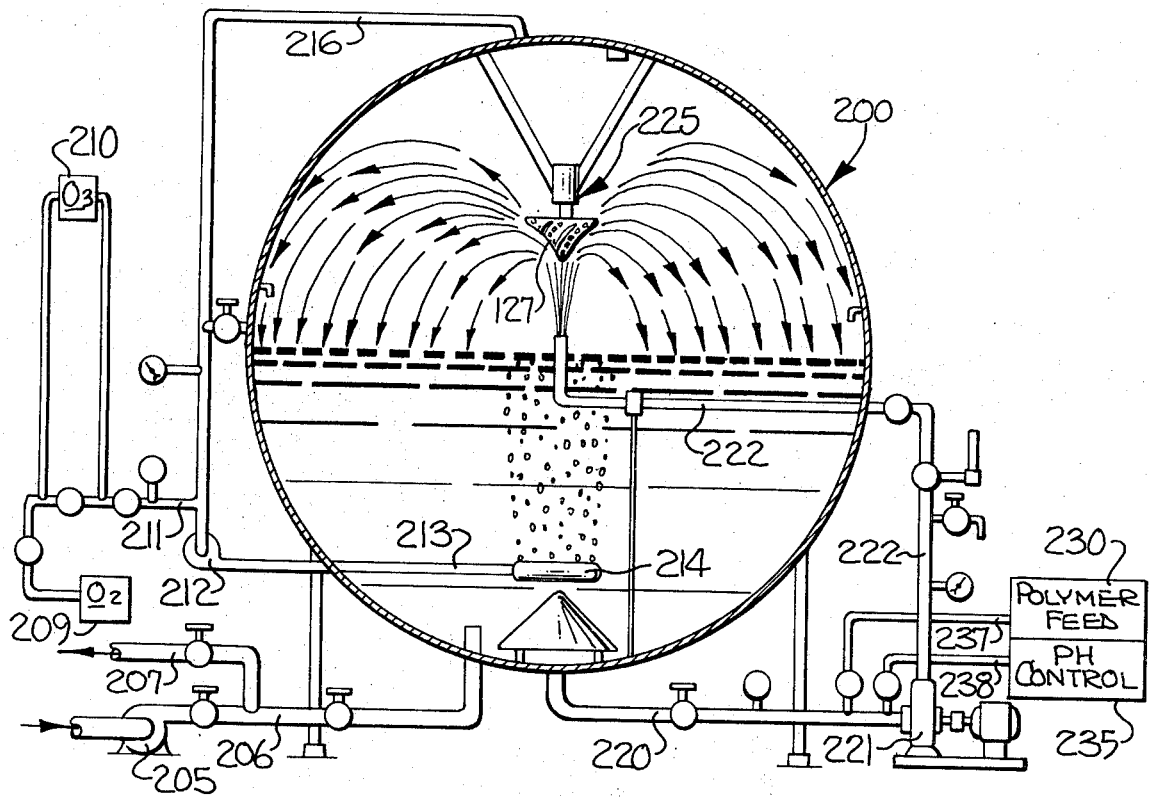
FIG. 14 is a diagrammatic sectional view taken through the vessel of FIG. 13.

Referring now to FIGS. 13 and 14, an enclosed pressurized treatment vessel in accordance with this invention may take the form of a generally spherical shaped vessel 200 constructed of the same materials described above with respect to the vessel 100. This vessel 200 would be supported by legs 201. This type of enclosed pressurized treatment vessel would be particularly adaptable for batch type waste treatment or for higher rate biological and chemical oxidation of sludge to produce a stable sludge end product that is odor free, sterile and easily dewatered in the shortest period of time. For best results with this type of treatment vessel, the sewage and waste or sludge should be aerobically activated prior to entering the treatment vessel.

In this arrangement, the influent would pass into the vessel through pump 205 and conduit 206 and could pass out of the vessel after treatment through the conduit 206 and conduit 207. These conduits could of course include suitable valves therein as indicated schematically in FIG. 14. Similarly to the above described treatment vessel 100, the sewage or sludge would fill the lower portion of this treatment vessel 200 and oxygen in the form of $O_2$ or $O_3$ would be fed from suitable supplies 209 and 210, through piping 211, pump 212 and piping 213 into the treatment vessel 200.

For this particular operation, it has been found preferable to diffuse the oxygen by means of a diffuser ring 214 having apertures therein directly into the sewage or sludge so that the oxygen will bubble up through the sewage or sludge and form a gaseous atmosphere of oxygen under pressure in the upper portion of the vessel 200. This would cause mixing and circulation of the sewage and sludge in the lower portion of the vessel. For recirculation of the oxygen from the upper portion of the vessel, piping 216 leads from the upper portion of the vessel and connects with the pump 212.

This treatment vessel 200 also includes a device for injecting a stream of the sewage or sludge from the lower portion thereof into the gaseous atmosphere of oxygen under pressure in the upper portion thereof. This device also comprises a conduit 220 leading from the bottom of the vessel 200, pump 221 for pulling the sewage or sludge from the bottom of the vessel through the conduit 220, and a conduit 222 leading back into the veessel 200 and terminating in the upper portion thereof for injecting a stream of the sewage or sludge into the gaseous atmosphere of oxygen in the upper portion of the vessel 200. A comminutor device 225, which is constructed exactly like the above described comminutor device 125, is disposed in the upper portion of the vessel 200 within the gaseous oxygen atmosphere and against which the stream of sewage or sludge is injected for breaking the sewage or sludge into small particles to allow the sewage or sludge to quickly absorb the oxygen under pressure in the gaseous atmosphere and so that more surface area of the sewage or sludge will be exposed to the oxygen to provide rapid treatment thereof.

This treatment vessel 200 may also include a polymer feed device 230 and a pH control device 235 which connect with the conduit 220 by conduits 237 and 238 respectively, for the purposes described above with respect to the treatment vessel 100.

This treatment vessel 200 may be utilized for treatments of the sewage or sludge with oxygen in the form of $O_2$ or $O_3$ successively or alternatively.

Thus it may be seen, that an apparatus and method for treatment of sewage and wastewater has been provided by this invention in which the final treatment of the sewage and wastewater may be accomplished in one or more compact modular vessels which may be mass produced and conveniently erected on the site and which eliminates undesirable features of conventional sewage treatment plants. By treating the sewage and waste under pressure with high purity oxygen, a much more efficient and much faster treatment process is obtained. Generally, the solubility of oxygen ($O_2$) in fresh water at one atmosphere is 9.2 parts per million at 20° C. (68° F.). When operating theoretically at four atmospheres the amount of dissolved oxygen ($O_2$) could reach 175 parts per million.

In the drawings and specification, there have been set forth preferred embodiments of this invention and, although specific terms are employed, they are used in a generic and descriptive sense only and not for purposes of limitation.

What is claimed is:

1. A liquid sewage and waste treatment apparatus for providing chemical oxidation of the contaminants and characterized by a high degree of oxygen absorption and utilization, said apparatus comprising an enclosed vessel defining a lower portion and an upper portion therein, and including inlet means for receiving liquid sewage and waste in said lower portion to define a liquid level, and outlet means for discharging the treated liquid;

means connected to said vessel for supplying oxygen to said upper portion of said vessel to define an oxygen rich atmosphere above said liquid level;

comminutor means disposed in said upper portion of said vessel and in spaced relation above said liquid level, and means for directing a stream of the liquid sewage and waste from said lower portion of said vessel upwardly to exit into the oxygen atmosphere and impinge upon said comminutor means such that the liquid sewage and waste is broken into myriad small particles, whereby the particles of liquid sewage and waste provide a substantial increase in the interfacial area between the liquid sewage and waste and oxygen so that the oxygen may be readily absorbed as the particles drop through the oxygen rich atmosphere.

2. A liquid sewage and waste treatment apparatus as defined in claim 1 wherein said comminutor means comprises a generally inverted, conically shaped head member, means for mounting said head member for free rotation about a generally vertical axis, and spiral grooves in said head member such that the stream of liquid sewage and waste impinging against said head member results in a high velocity rotary motion of said head member.

3. The liquid sewage and waste treatment apparatus as defined in claim 2 wherein said comminutor means further comprises a plurality of teeth mounted on said head member for aiding in breaking the liquid sewage and waste into small particles and for grinding up any solids which may be present in the sewage and waste.

4. The liquid sewage and waste treatment apparatus as defined in claim 3 wherein said teeth include means for removably mounting said teeth on said head member to permit easy removal thereof.

5. The liquid sewage and waste treatment apparatus as defined in claim 1 wherein said vessel is adapted to withstand an internal pressure of at least about four atmospheres, and said means for supplying oxygen to said upper portion of said vessel includes means for pressurizing the oxygen rich atmosphere within the vessel to thereby further increase the absorption of the oxygen by the particles of liquid sewage and waste.

6. The liquid sewage and waste treatment apparatus as defined in claim 1 wherein said enclosed vessel comprises a generally spherical shape for batch operation.

7. The liquid sewage and waste treatment apparatus as defined in claim 1 wherein said enclosed vessel comprises an elongated, generally cylindrical, horizontally-extending vessel and with said inlet means being positioned at one end and said outlet means being positioned at the other end thereof, said vessel further comprising a plurality of successive treating chambers therewithin and each including a said means for upwardly directing a stream of liquid sewage and waste and a said comminutor means for breaking the liquid sewage and waste into small particles so taht the liquid sewage and waste is successively treated throughout its flow through said vessel.

8. The liquid sewage and waste treatment apparatus as defined in claim 7 wherein said vessel includes transversely-extending baffle means spaced along the length thereof and positioned in said lower portion to divide said vessel into said plurality of successive treating chambers, said baffle means being of less height than the depth of the liquid sewage and waste in said vessel so that said liquid sewage and waste will flow around said baffle means during its flow through said vessel.

9. The liquid sewage and waste treatment apparatus as defined in claim 1 wherein said vessel further includes a transversely-extending baffle means positioned in said upper portion thereof to divide said upper portion of said vessel into first and second compartments, and said means for supplying oxygen to said upper portion of said vessel includes means for supplying oxygen in the form of $O_2$ into said upper portion of said first compartment for biological and chemical oxidation of the liquid sewage and waste, and means for supplying oxygen in the form of $O_3$ into said upper portion of said second compartment for sterilization and color, taste, odor, phenol, cyanide and phosphate reduction of the liquid sewage and waste.

10. The liquid sewage and waste treatment apparatus as defined in claim 1 wherein said means for supplying oxygen includes oxygen recirculation and sewage and waste mixing means comprising a conduit and pump means operatively connected between said upper portion of said vessel and said lower portion of said vessel for withdrawing oxygen from said upper portion and injecting the same into the liquid sewage and waste in said lower portion, and curved baffle means positioned in said lower portion of said vessel for creating a mixing action in the liquid sewage and waste as the oxygen is injected and diffused therethrough.

11. The liquid sewage and waste treatment apparatus as defined in claim 1 wherein said apparatus further includes ultraviolet light means positioned in said upper portion of said vessel for providing ultraviolet light in the gaseous atmosphere to provide a catalyst for the oxygen therein.

12. The liquid sewage and waste treatment apparatus as defined in claim 1 wherein said apparatus further includes ultrasonic wave means connected with said upper portion of said vessel for providing ultrasonic waves in said vessel to aid in reducing phosphates and the like in the liquid sewage and waste and for reducing the liquid particles passing through the gaseous atmosphere to still smaller particles and increasing the collision of the particles for more rapid transfer of oxygen into the liquid particles.

13. The liquid sewage and waste treatment apparatus as defined in claim 1 wherein said apparatus further includes polymer feed means connected with said vessel for supplying suitable chemicals into said vessel for chemical and physical reaction of substances in the liquid sewage and waste which are non-oxidizable.

14. The liquid sewage and waste treatment apparatus as defined in claim 1 wherein said apparatus further includes pH control means connected with said vessel for supplying suitable chemicals into said vessel for controlling the pH of the liquid sewage and waste therein within a desired range.

15. In a sewage and waste collection and treatment system, the combination of:
means for transporting, from a point of collection to a point of treatment, liquid sewage and waste which has tendendies to become septic and build up undesirable chemicals, gases, odors, bacteria and the like during the transportation due to the lack of proper oxygen content therein;
means positioned directly in said transporting means for supplying oxygen to the sewage and waste as it flows therethrough for preventing the sewage and waste from becoming septic, controlling the build-up of the aforesaid undesirables and stimulating the growth of undesirable aerobic bacterial; and
a treatment apparatus comprising
a. an enclosed vessel defining a lower portion and an upper portion therein, and including inlet means for receiving liquid sewage and waste in said lower portion from said transporting means to define a liquid level, and outlet means for discharging the treated liquid;
b. means connected to said vessel for supplying oxygen to said upper portion of said vessel to define an oxygen rich atmosphere above said liquid level;
c. comminutor means disposed in said upper portion of said vessel and in spaced relation above said liquid level, and
d. means for directing a stream of the liquid sewage and waste from said lower portion of said vessel upwardly to exit into the oxygen atmosphere and impinge upon said comminutor means such that the liquid sewage and waste is broken into myriad small particles, whereby the particles of liquid sewage and waste provide a substantial increase in the interfacial area between the liquid sewage and waste and oxygen so that the oxygen may be readily absorbed as the particles drop through the oxygen rich atmosphere.

16. In a sewage and waste collection and treatment system as defined in claim 15 wherein said means positioned in said transporting means for supplying oxygen comprises a plurality of means spaced from each other along the length of said transporting means for successively supplying oxygen to the liquid sewage and waste as it flows therethrough.

17. A method of treating liquid sewage and waste comprising the steps of
depositing the liquid sewage and waste in the lower portion of an enclosed vessel,
supplying oxygen to the upper portion of the enclosed vessel to provide an oxygen rich atmosphere above the liquid sewage and waste, and
directing a stream of the liquid sewage and waste from the lower portion of the vessel upwardly to exit into the oxygen rich atmosphere and impinge upon a comminutor disposed in the upper portion of the vessel and in spaced relation above the level of the liquid sewage and waste to break the liquid sewage and waste into myriad small particles and while permitting the particles of liquid sewage and waste to drop through the oxygen rich atmosphere so that the oxygen is readily absorbed by the particles.

18. The method as defined in claim 17 wherein the step of supplying oxygen to the upper portion of the enclosed vessel includes pressurizing the oxygen such that the oxygen rich atmosphere is maintained at a pressure above one atmosphere to further illustrate the absorption of the oxygen by the particles.

19. The method as defined in claim 17 further comprising the subsequent step of directing a second stream of the liquid sewage and waste from the lower portion of the vessel upwardly to exit into the oxygen rich atmosphere and impinge upon a second comminutor disposed in the upper portion of the vessel and in spaced relation above the level of the liquid sewage and waste such that the liquid sewage and waste is successively broken into small particles and exposed to the oxygen rich atmosphere.

20. The method of treating liquid sewage and waste as defined in claim 19 wherein the step of supplying oxygen to the vessel includes supplying oxygen in the form of $O_3$ for sterilization and color, taste, odor, phenol, cyanide and phosphate reduction of the liquid sewage and waste.

* * * * *